Patented Jan. 9, 1951

2,537,853

UNITED STATES PATENT OFFICE 2,537,853

PROCESS FOR THE MANUFACTURE OF ORGANIC PEROXIDES

Philip Pezzaglia, Oakland, Calif., assignor to Shell Development Company, San Francisco, Calif., a corporation of Delaware No Drawing. Application March 28, 1947, Serial No. 738,017

7 Claims. (Cl. 260—610)

This invention relates to the manufacture of organic peroxides and particularly relates to the manufacture of peroxides in which a tertiary organic hydroperoxide is reacted with an organic compound containing a keto group. Still more particularly, the invention relates to an improvement in such manufacture residing in effecting the reaction in the presence of a hydrocarbon solvent.

In copending application of Frank H. Dickey, Serial No. 515,813, filed December 27, 1943 (now abandoned), and an application which is a continuation-in-part thereof that has now issued as U. S. Patent No. 2,455,569, there is described and claimed certain novel organic peroxides and a method of making them. According to said patent application the invention therein is directed to a novel class of organic peroxides of the general formula R—O—O—$R_1$, wherein R represents a substituted or unsubstituted aliphatic tertiary radical, i. e. one containing not less than four carbon atoms of aliphatic character, one of said carbon atoms being directly bound to the oxygen atom of the peroxy (—O—O—) radical as well as to three other carbon atoms, while $R_1$ is a non-tertiary aliphatic radical, preferably saturated, in which the carbon atom directly attached to the other of the aforementioned peroxy oxygen atoms is also directly bound either to the hydroxyl radical or to a peroxyl radical —O—O—$R_2$ in which $R_2$ also represents a substituted or unsubstituted aliphatic tertiary radical. In one of its most specific embodiments, the aforesaid invention covers those peroxides of the above class in which the symbols $R_2$ and R represent like saturated aliphatic tertiary radicals. The invention also includes the process of preparing these novel peroxides.

The aforesaid invention, described in the copending application, is predicated on the discovery that organic hydroperoxides in which the organic radical is directly attached to the peroxy radical via a carbon atom which is also directly bound to three other carbon atoms, may be reacted with an organic compound containing a carbonyl radical, i. e. an aldehyde or a ketone, and that such an interaction results in the formation of the above-defined class of organic peroxides. More specifically stated, the aforesaid invention resides in the preparation of novel peroxides by reacting a tertiary organic hydroperoxide of the general formula

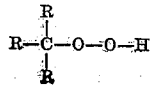

wherein each R represents a like or different organic radical, which may or may not be further substituted, with an organic compound containing a carbonyl group, this interaction of the tertiary organic hydroperoxide with the aldehydes or ketones being preferably effected at ordinary or sub-normal temperatures, and in the presence of an acid or acid-acting material, preferably a strong inorganic acid. This method of preparation, which is of broad and general application, results in the formation of novel organic peroxide compounds in which one of the oxygen atoms of a peroxy radical is directly attached to a carbon atom that is directly attached to three other carbon atoms, while the other oxygen atom of said peroxy radical is directly attached to a carbon atom which, in turn, is directly bound either to the hydroxy radical or to a peroxyl radical —O—O—R in which R represents a tertiary organic radical, preferably a saturated tertiary alkyl radical.

As in the process mentioned above, any organic hydroperoxide containing a tertiary-carbon atom attached to the hydroperoxy group (—O—O—H) may be used as one of the reactants in the manufacture of novel peroxides by the process of the present invention. A particularly suitable group of such hydroperoxides includes or comprises tertiary alkyl hydroperoxides. The following are illustrative examples of such tertiary alkyl hydroperoxides which may be used as one of the reactants in the manufacture of the novel peroxides in accordance with the process of the present invention: tertiary butyl hydroperoxide, tertiary amyl hydroperoxide and their homologues and analogues such as the tertiary alkyl hydroperoxides formed by the substitution of the hydroperoxyl (—O—O—H) radical for the hydrogen atom on one or more of the tertiary carbon atoms of such saturated aliphatic hydrocarbons as 2-ethyl butane, 2-methyl pentane, 3-methyl pentane, 2,3-dimethyl butane, 2,4-dimethyl pentane, and their homologues. Also, suitable substitution products such as the tertiary alkyl hydroperoxides in which a halogen atom or atoms are attached to one or more of the carbon atoms (other than the one carrying the hydroperoxyl radical) may be reacted with the organic compound containing a carbonyl group in accordance with the process of the present invention to produce the organic peroxides of the class defined herein. Such halo-substituted tertiary alkyl hydroperoxides may, for example, be obtained by the controlled oxidation with oxygen in the presence of hydrogen bromide of halogenated saturated aliphatic hydrocarbons of the type of 1-chloro-2- methyl propane, 1-bromo-2-methyl propane, 1-chloro-2-methyl butane, 1-bromo-3-methyl butane, 2-bromo-3-methyl butane, 2-chloro-3-methyl butane and the like. Still another group of hydroperoxides which may be thus employed includes compounds wherein one or more of the aliphatic radicals attached to the tertiary carbon atom (which is directly attached to the peroxy radical) are substituted by or contain attached thereto an aryl, alkaryl, aralkyl and/or alicyclic radical which may or may not be further substituted.

It was stated above that the process of the present invention comprises the reaction of a tertiary organic hydroperoxide, particularly a saturated tertiary alkyl hydroperoxide, with an organic compound containing a keto group. Although any such organic compound which contains a keto group may be employed as the substance which is reacted with the above-mentioned hydroperoxide, the process is especially suitable when applied to the use of saturated aliphatic and alicyclic ketones. Preferably the ketone has no polar substituents other than the keto group. The following are illustrative examples of saturated aliphatic ketones which may be thus employed: acetone, methyl ethyl ketone, methyl n-propyl ketone, methyl isopropyl ketone, diethyl ketone, methyl n-butyl ketone, ethyl n-propyl ketone, methyl isobutyl ketone, ethyl isopropyl ketone, methyl sec. butyl ketone, and the like and their homologues and suitable substitution products such as those in which various substituents are present in lieu of one or more of the hydrogen atoms of the above-defined ketones. For instance, hydroxy ketones such as acetyl carbinol, propionyl carbinol, butyryl carbinol, acetoin, diacetone alcohol, acetopropyl alcohol, acetobutyl alcohol, hydracetal methyl ethyl ketone, and the like, may be reacted with the hydroperoxides of the above class. Also diketones of the type of acetyl acetone, as well as the ketone acids, such as pyruvic acid, acetoacetic acid, levulinic acid, mesitonic acid, and the like may be employed. Still another subgroup of the ketones includes the alicyclic ketones, e. g. cyclopentanone, cyclohexanone, as well as derivatives thereof in which one or more of the hydrogen atoms of the nucleus are substituted by alkyl, aryl, alkaryl, aralkyl and/or alicyclic radicals, which may or may not be further substituted.

The reaction between the hydroperoxides and the above-mentioned organic compounds containing a keto group is effected in the presence of an acid or acid-acting catalyst, such as sulfuric acid, phosphoric acid, hydrochloric acid, hydrobromic acid, the sulfonic acids of benzene and its homologues, and the like. Generally, it is preferable to operate with inorganic acids of relatively high concentrations. For instance, highly satisfactory results have been obtained when the reaction was effected in the presence of concentrated hydrochloric acid. Nevertheless, in some cases, particularly when some of the more reactive ketones are to be condensed with the tertiary alkyl hydroperoxides, it is frequently desirable or even preferable to effect the reaction in the presence of relatively weaker or lower concentrations of these and like acid catalysts. For example, when resort is had to sulfuric acid, this acid may be employed in the form of 50% to 75% aqueous solutions thereof. The use of very low concentrations, i. e. weak acids, will as a rule decrease the rate of conversion and yields and thus may render the process uneconomical.

On the other hand, the use of excessively high concentrations, i. e. very strong acids of the type of fuming sulfuric acid, should be ordinarily avoided because they will tend to react with the hydroperoxides to form undesirable by-products. Nevertheless, these acids may be employed provided care is taken to maintain suitable operating conditions; for instance, when relatively strong acids are employed it is preferred to lower the operating temperature and/or reaction time to prevent or inhibit the undesirable side reactions, while a decrease in the acid strength will generally necessitate a corresponding increase in the temperature to permit economical conversions to and yields of the desired peroxides.

The novel class of compounds, which may be prepared according to the above process, may be generally represented by the formula

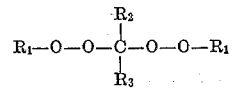

wherein each $R_1$ represents a like tertiary hydrocarbon radical, while $R_2$ and $R_3$ each represents a like or different hydrocarbon radical. A particular sub-group of this group comprises the peroxides having the above formula in which each $R_1$ is a substituted or unsubstituted saturated alkyl radical which is directly attached to the peroxy oxygen atom via a tertiary carbon atom of aliphatic character, while $R_2$ and $R_3$ each represents a saturated aliphatic radical, preferably a saturated primary or secondary aliphatic radical, i. e. a methyl, ethyl, propyl, isopropyl, n-butyl, isobutyl, etc. radical. The above peroxides may have various substituents attached to the different carbon atoms. For instance, one or more of the hydrogen atoms may be substituted by one or more halogen atoms, hydroxyl or carboxyl groups and/or aryl, alkaryl, aralkyl and/or alicyclic radicals. A specific example of the above-defined sub-group of novel compounds is ditertiary butyl isopropylidene peroxide which, as will be shown, is formed by reacting tertiary butyl hydroperoxide with acetone at a temperature of about 0° C. in the presence of concentrated hydrochloric acid. Another specific example is the ditertiary butyl sec.-butylidene peroxide formed by the condensation of tertiary butyl hydroperoxide with methyl ethyl ketone.

Although the invention described in the co-pending application mentioned above is a very useful one, we have now found that greatly improved results may be obtained in the reaction between the defined hydroperoxides and ketones by conducting the reaction in the presence of hydrocarbon solvents.

The best yield of the novel peroxides described above may be obtained when using a very short reaction period. The reason for this is that the acid used as a catalyst tends to cause undesirable side reactions with the product. These side reactions have lessened importance when the concentration of acid is kept low as the main obstacle in the way of obtaining high yields is the existence of a rather unfavorable equilibrium. Since one of the reaction products is water, it has been found helpful to remove the water of the reaction as it is formed. This may be done in various ways such as employing a drying agent or the use of azeotropic distillation.

It is important, of course, to obtain a high yield in any chemical reaction as a matter of economy; it is particularly important in the instant case to obtain high yields, since it permits the use of technical grades of hydroperoxides. Thus, tertiary butyl hydroperoxide is normally marketed as a technical solution which contains about 15% tertiary butyl alcohol and about 25% of di-tertiary-butyl peroxide. It is expensive to separate out the tertiary butyl hydroperoxide from this technical mixture and it is likewise expensive to separate the two peroxides which are found in the reaction product when employing the technical mixture. Thus, to utilize the technical grade of hydroperoxide and to obtain a product of high concentration, it is desirable that the reaction go substantially to completion. In general, it has been found that when the reaction goes to about 80% completion or higher the reaction product will be satisfactory. The percentage of completion as used hereinafter refers to the percentage of hydroperoxide which reacts.

It has been found that the most practical way of securing high yields is by the addition of an inert solvent to the reaction mixture. Although this invention is not predicated on any theory of its operation, it is believed that the function of the inert solvent is to increase the activity of the hydroperoxide. The hydroperoxide, being highly polar, tends to associate itself with the water molecules and the associated portion of the hydroperoxide thus tends to go into the aqueous phase of the reaction mixture, leaving the unassociated hydroperoxide in the organic phase. Since the unassociated hydroperoxide is the more active form, this relative increase in the percentage of unassociated hydroperoxide has the apparent effect of activating the peroxide, making the reaction go more vigorously. In this manner it is possible to have the reaction go substantially to completion with a low acid concentration and with a short reaction time so that side reactions are kept to a minimum.

The solvent used is preferably a hydrocarbon and a preferred sub-group of the hydrocarbon solvents are the aliphatic hydrocarbons. The solvent which is used should be a liquid under the particular reaction conditions chosen. Since the reaction may be carried out at temperatures of from −10° C. to 35° C., the solvent should be a liquid at these temperatures under normal pressures. When operating near the low end of the temperature range, solvents such as butane may be used, while when operating near the high end of the temperature range, solvents such as n-nonadecane may be used. Thus open-chain alkane solvents having from 4 to 19 carbon atoms such as n-butane, n-pentane, n-hexane, n-heptane, isooctane, n-decane, n-dodecane, n-heptadecane, and n-nonodecane may be used. Cycloalkane solvents such as cyclobutane, cyclopentane, cyclohexane, cyclobutane, cyclopentane, cyclohexane, cyclopeptane and cyclooctane are also suitable. Aromatic hydrocarbons may also be used, although it has been found that they are less effective than the alkanes. Suitable aromatic hydrocarbons include compounds such as benzene, toluene, and o-, m- or p-xylene.

The following non-limiting examples illustrate the operation of the invention.

Example I

A series of experiments was carried out in which methyl ethyl ketone was reacted with technical tertiary-butyl hydroperoxide in a molar ratio of 1.5 to 1, respectively. In each experiment 5 volume per cent of hydrochloric acid was used as a catalyst and the temperature was maintained at 0° C. In each experiment various volumes of heptane were added and the reaction was allowed to run for one hour. The following results were obtained:

| Moles of heptane per mole hydroperoxide | Percent of hydroperoxide reacted |
|---|---|
| 0 | 49 |
| 1 | 71 |
| 2 | 79 |
| 4 | 85 |
| 6 | 88 |

From the above it can be seen that the use of the inert solvent almost doubles the amount of hydroperoxide reacting.

Example II

The experiments of Example I were repeated using pentane in place of heptane. The following results were obtained:

| Moles of pentane per mole of hydroperoxide | Percent of hydroperoxide reacted |
|---|---|
| 0 | 49 |
| 1 | 67 |
| 4 | 85 |
| 6 | 87 |

Thus it may be seen that pentane has substantially the same effect on the reaction as heptane.

Example III

A reaction mixture containing one mole of technical tertiary-butyl hydroperoxide, 1.5 moles of methyl ethyl ketone and one mole of cetane were permitted to stand for one hour at 20° C. (The temperature of 20° C. was selected since cetane freezes at about 18° C.) It was found that 60.1% of the tertiary butyl hydroperoxide had reacted to form 2,2-bis(tertiary-butylperoxy)butane. The experiment was then repeated using two moles of heptane in place of one mole of cetane. It was found that 60.5% of the tertiary-butyl hydroperoxide had reacted to form 2,2-bis(tertiary-butyl)-butane. Inasmuch as cetane has a molar volume almost twice that of heptane, it is apparent that the volume of the solvent used rather than its molar proportion is the controlling factor.

Example IV

The experiment of Example I was repeated, using benzene instead of heptane. When 6 moles of benzene were used, it was found that 71% of the tertiary butyl hydroperoxide had reacted to yield 2,2-bis(tertiary-butyl peroxy)butane.

In carrying out the present invention from about 1 to about 10 volumes of solvent may be used, based on the total volume of reactants present, and it is preferred to use from 3 to 5 volumes of the solvent.

Example V

Instead of using the technical hydroperoxide used in the above experiments, a purified hydroperoxide was used containing 91.6% by weight of tertiary-butyl hydroperoxide. A mixture containing 10.2 ml. tertiary-butyl hydroperoxide, 24.6 ml. methyl ethyl ketone, 40.4 ml. pentane and 2.5 ml. hydrochloric acid was stirred in an ice bath for 90 minutes. A yield of 83% of 2,2-bis(tertiary-butylperoxy)butane was obtained.

Example VI

A continuous reactor was used consisting of a coil immersed in a constant temperature bath maintained at 0° C. The contact time was 30 minutes and the flow was 14.7 liters per hour. On an hourly basis the flow consisted of 2.72 liters of technical tertiary-butyl hydroperoxide, 9.52 liters of isopentane, 1.77 liters methyl ethyl ketone and 0.68 liter of 37% hydrochloric acid. The first two reactants were mixed and fed as one stream and the last two reactants were mixed and fed as a second stream into the reactor. The product was stabilized at a temperature of 20° C. and a pressure of 100 mm. giving a technical product containing 70.2% of 2,2-bis(tertiary-butylperoxy)butane.

The reaction between the hydroperoxide and the ketone in an inert solvent in the presence of an acid may be effected in a batch, intermittent or continuous manner. Although this reaction may be executed within a relatively wide temperature range, satisfactory yields may be obtained by conducting the reaction in the liquid phase at normal or subnormal temperatures, e. g. in the range of from about −10° C. to about 35° C. However, somewhat higher or lower temperatures may also be used. The optimum temperature will depend at least in part on the specific reactants and catalyst employed and on the strength and amount of the acid or acid reacting material used. The solvent selected should be one which is a liquid at the specific reaction temperature chosen. It was found that the reaction may be effectively realized by maintaining the reaction zone in an ice bath, i. e. at a temperature of about 0° C. The reaction is elastic in the sense that any desired proportion of the hydroperoxide, carbonyl compound and acidic agent may be employed. However, for optimum results it has been found that the carbonyl compound and hydroperoxide should be employed in molar ratios from about 1:1 to 2:1 and preferably 1.5:1. Although a drying agent such as calcium chloride may be used in the reaction mixture, such an agent need not be used when employing an inert solvent.

The peroxides produced according to the present invention find wide utility for such applications as dopes for Diesel fuels and as polymerization catalysts.

I claim as my invention:

1. In a process for the production of 2,2-bis-(tertiary-butylperoxy)butane by a reaction between tertiary-butyl hydroperoxide and methyl ethyl ketone in the presence of a strong acid at a temperature of from −10° C. to 35° C., the improvement which comprises conducting the reaction in from 1 to 10 volumes, based on the total volume of reactants, of an aliphatic hydrocarbon solvent which is liquid at the reaction temperature.

2. The process of claim 1 wherein the solvent is heptane.

3. The process of claim 1 wherein the solvent is pentane.

4. In a process for the production of bis-(tertiary-alkylperoxy)alkanes in which both alkylperoxy groups are attached to a single carbon atom by a reaction between a tertiary-alkyl hydroperoxide and an alkanone, which reaction is conducted in the presence of a strong acid at a temperature of from −10° C. to 35° C., the improvement which comprises conducting the reaction in from 1 to 10 volumes, based on the total volume of reactants, of a hydrocarbon solvent which is liquid at the reaction temperature.

5. In a process for the production of bis-(tertiary-alkylperoxy)-substituted saturated aliphatic hydrocarbons in which both alkylperoxy groups are attached to a single carbon atom, by a reaction between a tertiary-alkyl hydroperoxide and a saturated aliphatic ketone containing no polar groups other than carbonyl groups, which reaction is conducted at a temperature of from −10° C. to 35° C. in the presence of a strong acid, the improvement which comprises conducting the reaction in a hydrocarbon solvent which is liquid at the reaction temperature.

6. In a process for the production of an organic peroxide by a reaction in the presence of an acid between an organic hydroperoxide containing a tertiary-carbon atom attached to the hydroperoxy group (—O—O—H) and a ketone containing no polar group other than the keto group, the improvement which comprises conducting the reaction in a hydrocarbon solvent which is liquid at the reaction temperature.

7. In a process for the production of an organic peroxide by a reaction in the presence of an acid between an organic hydroperoxide containing a tertiary-carbon atom attached to the hydroperoxy group (—O—O—H) and a ketone, the improvement which comprises conducting the reaction in a hydrocarbon solvent which is liquid at the reaction temperature.

PHILIP PEZZAGLIA.

REFERENCES CITED

The following references are of record in the file of this patent:

UNITED STATES PATENTS

| Number | Name | Date |
|---|---|---|
| 2,400,041 | Dickey | May 7, 1946 |
| 2,455,569 | Dickey | Dec. 7, 1948 |

OTHER REFERENCES

Rieche B. 63, 2642–2653 (1930).

Ivanov et al., J. Gen. Chem. U. S. S. R. 8, 51, to 55 (1938).